United States Patent Office 3,309,426
Patented Mar. 14, 1967

3,309,426
POLYETHYLENE STABILIZATION OF VINYL
HALIDE RESINS
Csaba K. Hunyar, 1043 N. Sierra Bonita,
Los Angeles, Calif. 90046
No Drawing. Filed Apr. 19, 1962, Ser. No. 188,868
4 Claims. (Cl. 260—897)

This invention has to do generally with improving the properties of thermoplastic resins subject to physical processing for the purpose of developing or forming useful objects. More specifically, the invention is directed to eliminating or reducing certain deficiencies associated with or resulting from heat or fusion processing of vinyl type polymerization thermoplastic resins.

It is well known that vinyl type polymerization thermoplastic resins are subject to heat decomposition when exposed to elevated temperatures. These polymers typically include polyvinylchlorides and copolymers with polyvinyl acetate, polyvinyl alcohol, vinylidene chloride and other vinyl halogenides or halides. Heat treatment usually accompanies processing of the resins involving heat and pressure application.

Heat decomposition of the processed vinyl type resins leaves visible and invisible changes in the structure of the polymer, visible changes including blistering, gas evolution, and color changes up to so-called burning, where the material shows charring signs. Invisible but harmful effects include changes in physical properties and also the change in electrical properties. The heat decomposition starts with the splitting off of halogenic acid, which is usually hydrochloric acid, but can be any halogenic acid present in the polymer or copolymer. The acid molecules split from the chain molecules of the resin, this effect producing double bonds in the structure of the resin. The double bond itself is the carrier of the coloring effect, and it is chromophor. The split halogenic acid, such as hydrochloric acid, naturally in gaseous form, produces bubbles and blisters in the soft material at processing temperatures, and also changes the original size of the article, usually shrinking it but sometimes stretching and shrinking the material in different directions. Usually the heat treated pieces gain in thickness while shrinking in length and width dimensions. The halogenic acid (hydrochloric acid) and also other heat decomposition products generally destroy desired electrical properties, because such products are ionized. Also, the evolved halogenic acid and other decomposition products act as further catalyzing agents for decomposition, the effect of these catalysts causing the decomposition to proceed with increasing speed.

Certain types of additives, called stabilizers, have been used to prevent harmful degradation and heat decomposition of vinyl type materials. These known additives usually cannot prevent the initial heat splitting, but, to limited extent, are able to control the further proceeding of the reaction. Naturally there is a limit to the efficiency of these stabilizers, and after a certain heat treatment time the undesired breakdown occurs and proceeds with increasing speed. Primary stabilizers (usually metal salts of fatty acids, naphthenic acid, etc.) are active alone, whereas secondary stabilizers such as epoxides are used for boosting the effect of the primary stabilizer but are not themselves effective to a significant degree. These stabilizers are generally noncompatible with vinyl type thermoplastic polymers, there being a tendency for the undesirable so called "plate out" effect to occur as a result of their use.

The present invention relates to a method for stabilizing vinyl resins especially against gaseous decompositions, and blistering, upon elevated temperature processing. The vinyl resins to be treated include homopolymers and copolymers of vinyl halides, vinylacetates, and vinylidene products. More specifically, a major purpose of this invention is to provide for improved stabilization of vinyl resins through the use of a new class of stabilizing agents producing a superior heat stability against gaseous heat decomposition and also permitting full development of desired coloring of the resin. In accordance with this object I have found useful stabilizing materials to include polyethylene products which are solid at room temperature.

Different polyethylene chain lengths in general produce different physical characteristics in the vinyl resin, longer chains giving the vinyl material a higher melting point than shorter polyethylene chains. Longer chains produce higher viscosity and therefore influence differently the masticated vinyl material under processing conditions. Usually the vinyl material melts before the necessary masticating temperature is reached, so that even and well distributed mastication is insured. The polyethylene material is generally translucent to transparent and colorless, and does not affect the original color of the vinyl polymer.

A very important property of the resultant material is its excellent dielectric behavior. Polyethylenes possess excellent electrical properties, and therefore this compound blended with the vinyl polymer as the stabilizer is much better in dielectric properties, than with any metal soap stabilizer used. This is very important in compounds used for electrical applications where dielectric properties are desired. The resultant material is also tasteless and nontoxic, opening the possibility for use in compounds where no toxicity can be tolerated, as for example in food and drug packaging. Because of the relative toxicity of the recently used metallic fatty soaps, the non-toxic property of the polyethylene stabilizer has clear advantages and opens the way for food packaging applications of the vinyl compound, in replacement of much more expensive materials now in use.

The stabilizer is also practically insoluble in water, this property accounting for the lower water absorption of the vinyl compound made with polyethylene stabilizer. The polyethylene stabilizer is, in addition, very stable in regard to the action of various organic liquids, and therefore decreases the organic liquid penetration of the polymer blend made with polyethylene stabilizer.

A very important factor in the processing of vinyl type polymers, namely the lubricity of the product, is easily controllable with the use of polyethylene stabilizers. The stabilizer itself provides lubricity in different degrees, the amount of lubricity depending generally on the molecular weight of the stabilizer. The lubricity of these stabilizer products is sufficient, even with the use of low weight percentages thereof in the vinyl resin, that no additional lubricant is necessary in the polymer compound. While some stabilizing effect will be found to result over a relatively wide range of proportions, for most applications, the stabilizer additions will lie in the range 0.5% by weight to 2% by weight of the product, the desired amount depending not only on the stabilizer used but also on type of vinyl material used and its properties.

The vinyl halide resins (usually vinylchloride resin) usable in conjunction with this invention are not confined to the basic resins and their copolymers, but include other polymers which are compatible with vinylacetate and other vinylesters of monocarboxylic acids, alkyl esters of maleic and fumaric acid, and alkyl esters of acrylic and methacrylic acids.

The method of stabilizing the vinyl type polymer resins requires only physical addition and thorough incorporation or blending of the stabilizer into the resin. Since most of the stabilizers are wax-like easily powdered materials, powder form solid blending technology is usable.

If large amounts of plasticizers are used, a blending method which incorporates the usually liquid plasticizer with the solid powdery stabilizer should be selected. In practical applications the stabilizer is blended into the resin powder by solid blending technique before heat processing, but direct addition on the hot mills, or other heat processing equipment may be used also. If liquid plasticizers are used, it is advantageous to solid blend the resin and the solid stabilizer together prior to blending in the plasticizer. The resins may be compounded on conventional heat processing equipment, such as heated roll mills, Banbury mixer, extruding apparatus and the like.

In the following examples, the vinyl type thermoplastic polymer resin is a polyvinylchloride resin, or a vinyl chloride-vinyl acetate copolymer, without the addition of stabilizer other than that mentioned. These examples will illustrate specific embodiments of the invention without limiting same to the specific details given.

EXAMPLE 1 (CONTROL)

A vinylchloride-vinyl acetate copolymer comprising 85% by weight of vinyl chloride and 15% by weight of vinylacetate was placed in powder form between two metal sheets, preheated at 300° F. for 30 seconds and pressed with approximately 2000 p.s.i. to a transparent sheet. This material could not be milled on roll mills without burning, and could only be prepared as described to produce sheeted material without a stabilizer for control. The resultant sheet was used as a typical nonstabilized control material for comparison with the following experimental examples.

EXAMPLE 2

The same vinyl copolymer powder as described in Example 1 was dry blended with 1% by weight of polyethylene having the following specifications:

| | |
|---|---|
| Melting point, ° F. | 220–230 |
| Average molecular weight | 2000–2500 |
| Specific gravity | 0.90–0.92 |
| Average viscosity at 140° C. | 180 |

The material was milled on roll mills with surface temperature 300° F., roll speed 40/44, roll ratio 1:1.1 for 4½ minutes, and sheeted. The samples taken from the sheet were heat tested against the control (Example 1) in an oven at 135° C. for 90 minutes. The control was seriously blistered and charred in a relatively short time, whereas the Example 2 stabilized compound did not show decomposition, blistering or charring.

EXAMPLE 3

The same vinyl copolymer of Example 1 was dry blended with 1% addition of polyethylene stabilizer having the following specifications:

| | |
|---|---|
| Melting point, ° F. | 225–235 |
| Average molecular weight | 5000 |
| Specific gravity | 0.90–0.92 |
| Average viscosity at 140° C. | 4000 |

The material was mill sheeted and tested as in Example 2, and showed the same superior heat resistance as did the material of Example 2.

EXAMPLE 4

Pure polyvinylchloride powder of relatively low viscosity was dry blended with 1% by weight of polyethylene stabilizer with specifications the same as in Example 2. The blended material was roll milled, sheeted, and heat tested in the same way as in Example 2, but with roll temperature 325° F. The product showed a good heat stability compared to the control material (Example 1), and did not show decomposition, charring or blistering.

EXAMPLE 5

Pure polyvinylchloride powder with 1% by weight addition of polyethylene stabilizer having the specifications of Example 3 was roll milled, sheeted, and tested as in Example 4. The product gave a very good heat stability compared with the control material, and did not exhibit decomposition, charring or blistering.

EXAMPLE 6

The same vinylchloride-acetate copolymer of Example 1 was dry blended with 1% addition by weight of saponifiable polyethylene stabilizer having the following specifications:

| | |
|---|---|
| Melting point, ° F. | 215–225 |
| Specific gravity | 0.92–0.94 |
| Acid number | 12–20 |
| Viscosity at 140° C., cps. | 160 |

The product mix was roll milled, sheeted, and tested as in Example 2. The resulting sheeted sample gave a very good heat stability compared to control material (Example 1), and did not exhibit decomposition, charring or blistering.

EXAMPLE 7

Pure polyvinyl chloride as tested in Example 4 was dry blended with 1% by weight addition of saponifiable polyethylene stabilizer as specified in Example 6. The product mix was roll milled, sheeted and tested as in Example 2, and the sample showed a very good heat stability compared with the control material, there being no evident decomposition, charring or blistering.

Different modifications and variations in the processes, stabilizers and compositions described above may be made without departing from the spirit and scope of my invention as defined in the appended claims.

I claim:
1. The process for stabilizing a vinyl thermoplastic resin against heat decomposition, the resin being selected from the group consisting of vinyl halide homopolymers and vinyl halide-vinyl acetate copolymers, that includes intimately blending said resin with solid polyethylene as the only stabilizer to form a mix, and physically processing said mix at an elevated temperature within the range of about 300°–325° F., the amount of said polyethylene stabilizer being within the range of about 0.5 to 2.0% by weight of said mix, and being sufficient to inhibit charring and blistering of the resin at said elevated temperature.
2. The process of claim 1 in which said polyethylene is about 1% by weight of the mix.
3. The product obtained by the process of claim 1.
4. The product obtained by the process of claim 2.

References Cited by the Examiner
UNITED STATES PATENTS

| | | | |
|---|---|---|---|
| 2,897,176 | 7/1959 | Rocky et al. | 260—897 |
| 2,944,040 | 7/1960 | Pollock et al. | 260—897 |

MURRAY TILLMAN, *Primary Examiner.*

J. A. KOLASCH, T. G. FIELD, *Assistant Examiners.*